(12) United States Patent
de Haas et al.

(10) Patent No.: US 10,411,417 B2
(45) Date of Patent: Sep. 10, 2019

(54) MODULAR WALL SYSTEM AND PANEL ELEMENT FOR USE IN SUCH A SYSTEM

(71) Applicant: Opticon Sensors Europe B.V., Hoofddorp (NL)

(72) Inventors: Dick de Haas, Hoofddorp (NL); Rudi Groeneveld, Hoofddorp (NL)

(73) Assignee: Opticon Sensors Europe B.V., Hoofddorp (NL)

( * ) Notice: Subject to any disclaimer, the term of this patent is extended or adjusted under 35 U.S.C. 154(b) by 42 days.

(21) Appl. No.: 15/542,638

(22) PCT Filed: Jan. 11, 2016

(86) PCT No.: PCT/NL2016/050018
§ 371 (c)(1),
(2) Date: Jul. 10, 2017

(87) PCT Pub. No.: WO2016/111628
PCT Pub. Date: Jul. 14, 2016

(65) Prior Publication Data
US 2018/0269637 A1 Sep. 20, 2018

(30) Foreign Application Priority Data
Jan. 9, 2015 (NL) ...................................... 2014105

(51) Int. Cl.
*H02G 3/18* (2006.01)
*A47F 5/08* (2006.01)
(Continued)

(52) U.S. Cl.
CPC .............. *H01R 13/74* (2013.01); *A47F 5/08* (2013.01); *E04F 13/074* (2013.01);
(Continued)

(58) Field of Classification Search
CPC ............ H02G 3/18; H02G 3/16; H02G 3/185; H02G 3/28; H02G 3/288; H02G 3/388;
(Continued)

(56) References Cited

U.S. PATENT DOCUMENTS 2,156,463 A * 5/1939 Schulte ................ H01H 13/183
200/60
4,339,788 A * 7/1982 White ................ F21V 23/0414
362/157
(Continued)

FOREIGN PATENT DOCUMENTS

GB 1449369 A * 9/1976 ........... H01R 13/514
WO WO 2014/047690 A1 4/2014

*Primary Examiner* — Phi Dieu Tran A
(74) *Attorney, Agent, or Firm* — Kaplan Breyer Schwarz, LLP

(57) ABSTRACT

A panel element is for use in a modular wall system with vertical support structures. The panel element includes a panel having a planar surface and side edges transverse to the planar surface, the planar surface can be hung up on at least one of the vertical support structures. An electrical connector is provided on the back of the panel, including a first connector pin and a connector second pin for forming electrical connections. The first and second connector pins fit within openings in a surface of one of the vertical support structure. The connector pins are movably coupled to the panel so as to allow movement of the first and second connector pins in at least one direction parallel to the planar surface between an extended position and a pulled-in position.

17 Claims, 3 Drawing Sheets

(51) Int. Cl.
*H01R 13/74* (2006.01)
*H02G 3/38* (2006.01)
*E04F 13/074* (2006.01)
*E04F 13/08* (2006.01)
*H01R 13/15* (2006.01)
*H01R 13/627* (2006.01)
*H02G 3/30* (2006.01)

(52) U.S. Cl.
CPC ......... *E04F 13/0803* (2013.01); *H01R 13/15* (2013.01); *H01R 13/6271* (2013.01); *H02G 3/30* (2013.01); *H02G 3/388* (2013.01); *H02G 3/18* (2013.01); *H02G 3/288* (2013.01)

(58) Field of Classification Search
CPC .......... F21V 19/00; F21V 17/02; F21V 21/00; F21V 21/002; F21V 21/12; F21V 21/35; F21V 21/30; F21V 21/26; H01R 13/74; H01R 13/15; H01R 13/6271; A47F 5/08; E04F 13/074; E04F 13/0803
See application file for complete search history.

(56) References Cited

U.S. PATENT DOCUMENTS

| | | | | |
|---|---|---|---|---|
| 4,689,726 | A | * | 8/1987 | Kretzschmar ....... F21V 19/0085 362/127 |
| 5,034,861 | A | * | 7/1991 | Sklenak ................. A47F 3/001 312/236 |
| 5,892,192 | A | * | 4/1999 | Ishiguro ............ B60H 1/00985 200/314 |
| 6,079,173 | A | | 6/2000 | Waalkes et al. |
| 7,810,955 | B2 | * | 10/2010 | Stimac .................... F21S 2/005 362/249.01 |
| 8,533,394 | B2 | * | 9/2013 | Giri ..................... G06F 11/2226 703/17 |
| 9,115,927 | B2 | * | 8/2015 | Rackley ................ F25D 25/025 |
| 9,546,781 | B2 | * | 1/2017 | Myers ..................... F21V 23/06 |
| 2010/0135020 | A1 | * | 6/2010 | Moore ................... A47F 11/10 362/249.02 |
| 2011/0273867 | A1 | | 11/2011 | Horst et al. |

* cited by examiner

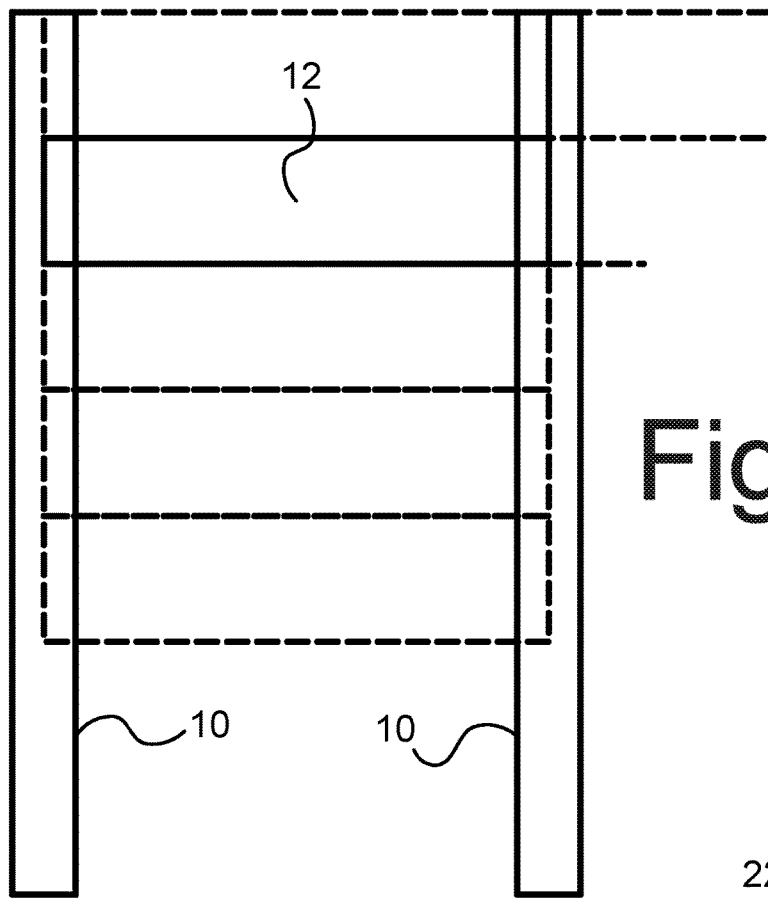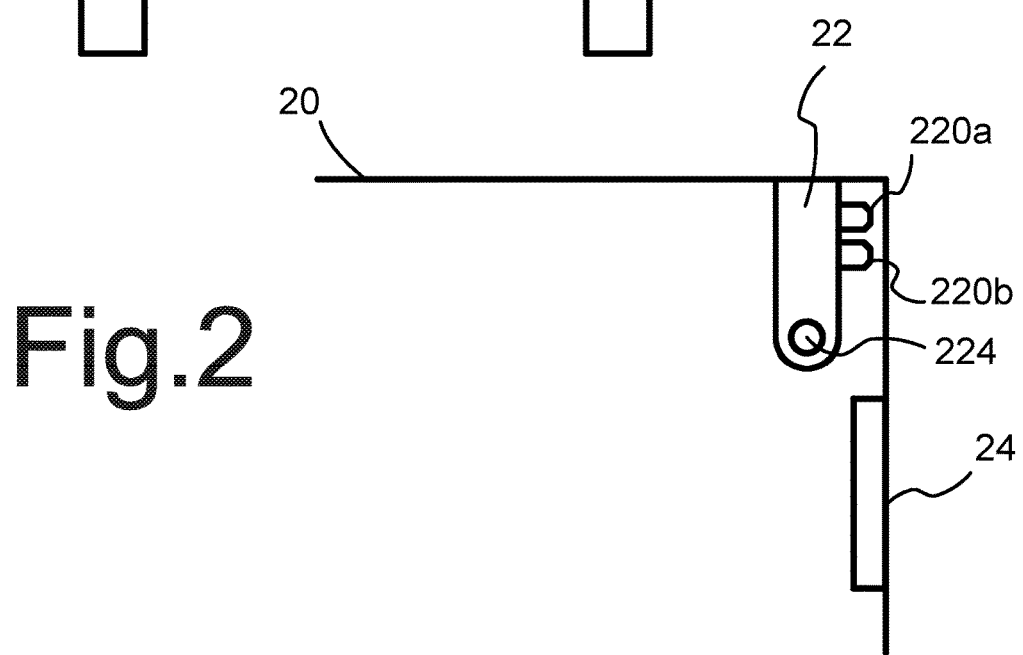

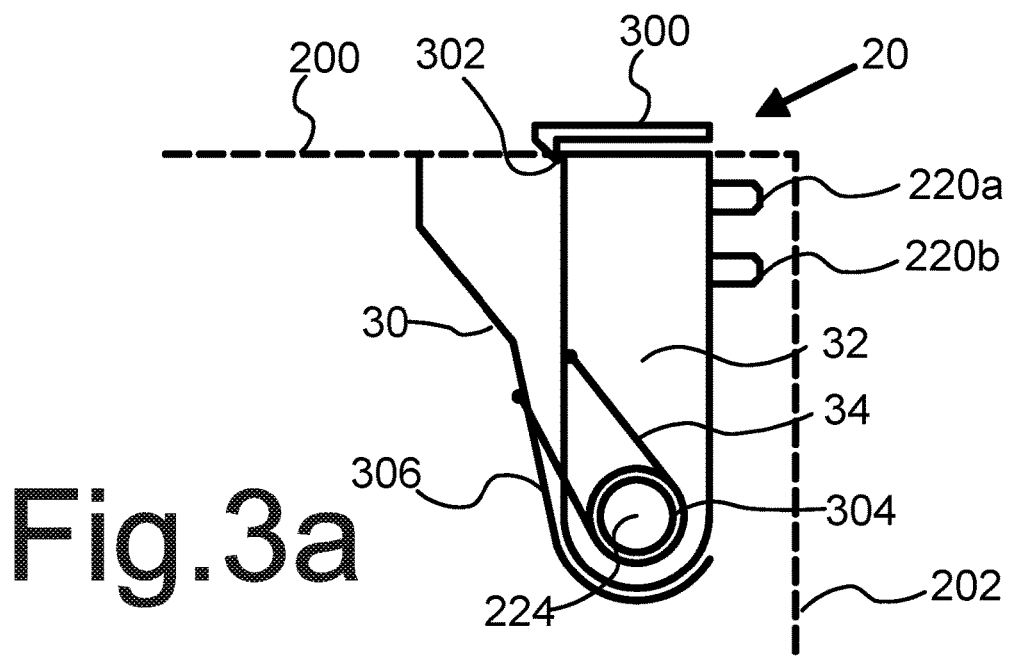
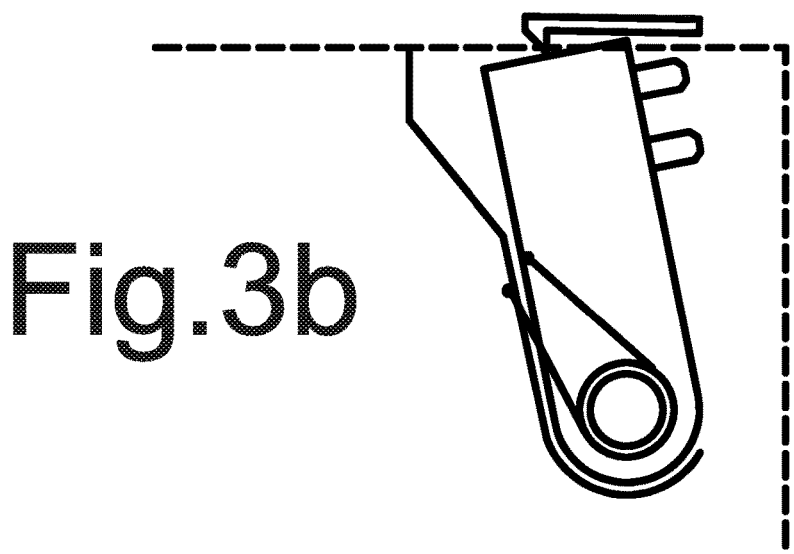

MODULAR WALL SYSTEM AND PANEL ELEMENT FOR USE IN SUCH A SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The invention relates to a modular wall system, for example a retail shelf system for display of retail articles, with a panel that contains an electric circuit. Furthermore, the invention relates to a panel for use in a modular wall system.

Background Description of the Related Art

In retail shops products are presented on walls and on shelves that extend from such walls. Free standing walls within a shop space or walls on the wall of the shop space itself may be used. In a modular wall system, the wall is constructed from free standing vertical support structures, or vertical support structures attached to the wall of the shop space, and vertical panels that are hung up on the vertical support structures. Horizontal shelves may also be hung up, fixed on the vertical panels that hang on the vertical support structures or hung up directly on the vertical support structures.

The shelves and panels may be provided with electrical components, such as display screens for showing product and pricing information, wireless communication circuits for updating such information, light sources etc. Electrical power supply voltage may be applied to such components from the vertical support structures via electrical wiring that runs through the panels and if need be through the shelves.

From US patent application No. US20110273867 it is known to provide electrical connectors in a horizontal shelf of a modular system. The shelf hangs between two vertical support structures and one of the vertical support structures contains vertical electrical power supply conductor tracks. The shelf contains an electric circuit with spring loaded contact pins at a side edge of the shelf, for contacting the vertical conductor tracks in the adjacent vertical support structure.

SUMMARY OF THE INVENTION

It is preferred to a panel element for a modular wall system available that can easily be installed and that can be electrically connected to power supply contact in a vertical structure of the system with a reduced risk of contact bounce when the panel element is hung up.

A first aspect provides a panel element for use in a modular wall system with vertical support structures is provided, in which at least one of the vertical support structures comprises first and second electrical power supply contacts within said at least one of the vertical support structures and further openings on a surface of the at least one of the vertical support structures, configured to passage of pins to contact the first and second electrical power supply contacts. Back edges of the panel may hang against a front surface of the vertical support structures, adjacent the side surface.

The panel element comprises a panel having a planar surface and side edges transverse to the planar surface and an electrical connector. The electrical connector comprises a first connector pin and a connector second pin for forming electrical connections, the first and second connector pins having a cross-section configured to fit within the further openings, the connector pins being movably coupled to the panel so as to allow movement of the first and second connector pins in at least one direction parallel to the planar surface, between an extended position and a pulled-in position of the electrical connector, the electrical connector being spring loaded to exert a force towards assumption of the pulled-in position. The panel element further comprises a detent configured to latch the electrical connector in the extended position.

In extended position the tips of the connector pins are further from a fixed part of the connector than in the pulled-in position. The extended position corresponds to a location of the tips of the connector pins wherein they are in contact with the first and second electrical power supply contacts within the vertical support structure. The pulled-in position correspond to a location of the tips outside the outside surface of the vertical support structure of substantially at the outside surface. In this way, electrical power supply to the panel may be established after the panel has been hung up with the connector in the pulled-in position, by subsequently latching the connector into an extended position. Before the panel is taken from the system, the contact can be broken by releasing the latch, so that the connector returns to the pulled-in position.

In an embodiment, the electrical connector comprises a housing within or attached to the panel and a movable part that is movable relative to the housing, the first and second connector pins being located on the movable part. Thus, the switch between the two states can be made by moving the moving part relative to the housing.

In an embodiment, the electrical connector has an access opening to a space between a wall of the housing and an inside wall of the moving part, the first and second connector pin extending from an outside wall of the moving part. By placing a finger or a tool in the access opening the moving part can easily be moved. In another embodiment, the connector may comprise a lever to move the moving part.

In an embodiment, the electrical connector is located at a top or bottom edge of the panel, the access opening or lever being accessible from a direction transverse to the top or bottom edge. This facilitates moving the connector pins between the positions when the panel element has been hung up.

In an embodiment, the electrical connector is located at a corner of the panel. This facilitates contact with the vertical support structure at the corner. When the at least one vertical support structure is located between the edges of the panel, the connector may located to be near it, removed from the corner.

In an embodiment, the connector is located backward from a back plane of the panel. Thus contact can easily be established through the side of the vertical support structure when the back plane of the panel hangs against the front surface of the vertical support structures.

In an embodiment, the connector comprising a hinge coupling between the housing and the movable part, configured to allow rotation around a rotation axis normal to the back plane of the panel, whereby the first and connector pins are moved in a plane parallel to the back plane of the panel. As used herein a hinge coupling means any form of coupling that allows relative rotation around a predetermined rotation axis.

In an embodiment, the housing comprises a resilient lip attached to the fixed part and a detent notch on the resilient lip. This may be used to enable latching. In an embodiment, the panel has a closed surface at its back plane the housing lying on the back plane of the panel. Thus accidental contact with the electrical wiring can be prevented. In an embodiment, the first and second connector pins comprise at least one electrically insulating bus and a first and second electrically conductive tip located in the least one electrically insulating bus. This makes it easier to prevent electrical contact with the outside of the vertical support structure, e.g. when it is of metal.

In an embodiment, the connector comprises a further connector pin electrically connected to as same power supply line in the panel as the first connector pin, the further connector pin being directed in parallel with the first connector pin. This may be used to make contact more reliable. In an embodiment, further pins are used for both connector pins.

The panel element may be part of a modular wall system comprising a first and second vertical support structure and a panel element according to any one of the preceding claims hung-up on first and second vertical support structure, the first vertical support structure comprising first and second electrical power supply contacts internally and first and second contact openings in an outside surface of the first vertical support structure, the first and second connector pin being in contact with the first and second power supply contact through the first and second contact openings respectively in said extended position.

In an embodiment, the first and second electrical power supply contacts are part of a surface of the first and second internal vertical conductor lane respectively. The outside surface of the first vertical support structure may comprise sets of first and second contact openings at a plurality of heights along the first vertical support structure. Thus a panel hung up at any of the heights can be powered, or a plurality of panels hung up at different heights can be powered. The first and second vertical support structure may be provided with openings and/or protrusions for hanging the panel element on the first and second vertical support structures at the respective different heights. In an embodiment a back surface of the panel element hangs facing front facing parts of the outside surface of the first and second vertical support structure (i.e. parts facing a viewer standing in front of the wall) and the first and second contact openings are located in a side facing part of the outside surface of the first vertical support structure (e.g. facing the second vertical support structure).

BRIEF DESCRIPTION OF THE DRAWINGS

These and other objects and advantages will become apparent from a description of exemplary embodiments with reference to the following figures.
FIG. 1 shows a modular wall system
FIG. 2 shows a detail of panel element
FIG. 3 shows a connector

DETAILED DESCRIPTION OF THE INVENTION

Figure 4:
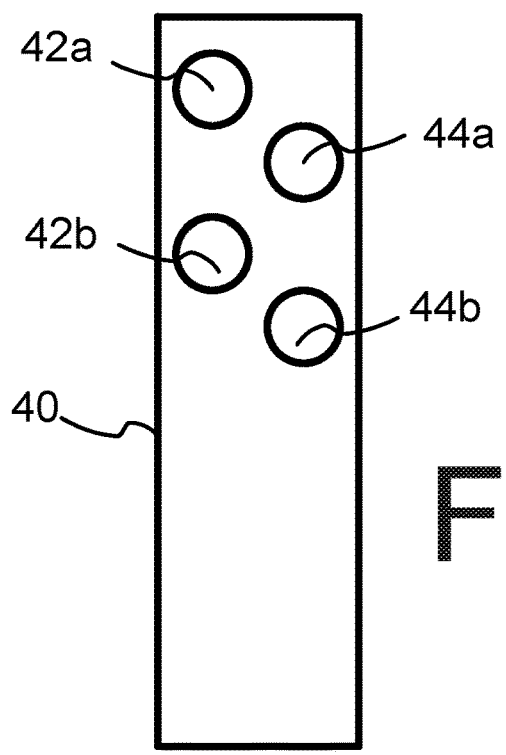
FIG. 4 shows a detail of a connector

FIG. 1 shows a modular wall system that comprises two parallel vertical support structures 10 and panel elements hanging on the vertical support structures 10. Only one of the panel elements 12 has been labeled (shown by solid lines, the others are indicated by dashed lines). Free standing vertical support structures 10 on the wall of a shop space may be used or vertical support structures 10 within the shop space, so that customers can walk along opposite sides of the wall within the shop space. Panel element 12 comprises a panel that extends between vertical support structures 10.

The panel element 12 preferably extends between the side edges over a length that is at least substantially equal to, but may also be more than, the distance between successive ones of the vertical support structures 10. In another embodiment, in which the panel element 12 may be supported by a single vertical support structure 10, the length may be less than the distance between successive ones of the vertical support structures 10.

In use, the modular wall system is installed by erecting vertical support structures 10, for example by attachment to a wall, and hanging panel element 12 on vertical support structures 10, with its main surfaces extending vertically. For this purpose, the front of each vertical support structures 10 may contain a slot to receive a protrusion such as a hook at the back of panel element 12. However, other ways of connection may be used for hanging up the panel element 12, e.g. with hooks from support structures 10 hooked in slots in panel element 12, or combinations of both.

Such other ways of connecting the panel element 12 to the vertical support structures 10 may include mating members of a first type provided on the vertical support structures and mating members of a second type provided on the panel element 12. The mating members of the first type are arranged to mate with the mating members of the second type for connecting the panel element 12 to the vertical support structure 10. The slot and protrusion as discussed above are such mating members. Other types of mating members may be envisaged as well. Such mating members may each comprise a single element, like a single protrusion like a hook and a single opening like a slot. Alternatively, such mating members may comprise multiple mating elements. Such multiple mating elements may be of the same type, like openings, but they may also be of other types, like protrusions and openings.

In yet another embodiment, the panel element 12 itself does not comprise any mating members of any type. Rather, the panel 12 is in such embodiments carried by a shelf bracket, which shelf bracket is connected to the vertical support structure 10. The shelf bracket is preferably connected to the vertical support structure 10 by means of mating members as discussed above.

Although only one panel element 12 is shown, in practice a plurality of such elements and/or other elements may be hung up together on vertical support structures 10. A series of openings or protrusions at different heights may be provided in each vertical support structure 10 to allow the panel element or elements to be hung up at a selectable height. More than two parallel vertical support structures 10 may be used and panel element may extend between more than one pair of adjacent vertical support structures 10.

Panel element 12 contains one or more electrical components such as a wireless communication circuit, an RFID reader, a memory, a microcontroller, a display screen, an electrical light source etc. For example, the RFID reader may configured to read a RFID tag of a product located within reading range from the panel, and the wireless communication may be configured to send tag data that has been read and received back information for display on the display screen.

Furthermore, panel element contains electrical wiring to supply power to the one or more electrical components. The electrical wiring is located in panel element 12. Panel element 12 has a back plane defined by the back end of its edges, the electrical wiring lying between the front and back plane of the panel element 12. For example, when panel element 12 has closed front and back surfaces in its front and back plane, the electrical wiring may be enclosed between the front and back surface. Preferably, the electrical contacts between the electrical wiring and the one or more electrical components are also enclosed between the front and back surface.

In addition to this type of panel element, other elements without electrical wiring may also be hung up on vertical support. Panel element 12 may comprise a horizontal shelf attached to the vertical front surface of the vertical panel. The electrical wiring in the vertical panel may be connected to one or more electrical components in or on the shelf in this case, for example via electrical wiring in the shelf. Alternatively, one or more horizontal shelves with or without electrical wiring may be hung up directly on vertical support structures 10 mixed with one or more panel elements.

The electrical wiring in the panel element 12 connects to a connector at a top or bottom edge of the vertical panel of panel element 12 on its back side, near one of the vertical support structures 10. Power is supplied to the electrical wiring in the panel element 12 from one of the vertical support structures 10. For this purpose, at least this vertical support structure 10 has electrical contacts to supply a power supply voltage between those contacts. For safety reasons, the contacts are provided internally within the vertical support structure 10, rather than on its outer surface, with small contact openings in the outer surface to enable connector pins to access the power supply contacts.

In an alternative embodiment, the openings in the vertical support structure 10 are larger. If the voltage of the power supply does not have a level that is hazardous to men, the openings on the support structure 10 may be larger. In one particular embodiment, the openings in the vertical support structure 10 are open for a substantial part of the vertical support structure 10, over the length of the vertical support structure 10. This provides enhance flexibility in choosing the level at which the panel element 12 may be attached to the vertical support structure 10. In one particular embodiment, the opening in the vertical support structure 10 for accommodating electrical contacts is a ridge in which the electrical conductors are embedded. The ridge may accommodate one or more electrical conductors and/or each electrical conductor may embedded in one ridge.

The contact openings may be circular for example with a diameter of no more than 5 mm. The contact openings are provided on the side of the vertical support structure 10, i.e. transverse to the openings or protrusions on the front for hanging up panel element. Alternatively or additionally, the contact openings are provided on the same side as the openings or protrusions. The vertical support structure 10 may comprise a series of pairs of such contact openings for electrical contact a different heights, to allow the panel element to be hung up at a selectable height. The vertical support structure 10 may comprise pairs of vertical power supply lines to form contacts at different heights.

FIG. 2 shows a detail of panel element 12, including panel 20, connector 22 and a hook 24. Panel 20 is rectangular, for example with a length of at least 0.5 meter a height of at least 0.1 meter and a thickness of less than 0.05 meter or less than 0.1 meter. The plane of the figure is parallel to the main plane of panel 20, i.e. normal to the direction of the shortest extent of panel 20 (the thickness). Panel 20 has a back plane defined by the back end of its edges, e.g. on the front surface of the vertical support structures. Panel 20 may have a closed back surface in said back plane. This has the advantage that electrical wiring need not be exposed. But alternatively at least part of the back plane may be open. In this case other structures may be used to cover the electrical wiring.

In the embodiment of the FIG. 2, the hook 24 extends perpendicularly to this plane. Therefore it is shown only schematically as a rectangle. A similar hook is provided at the opposite side edge (not shown) of panel 20. The hooks serve to hang panel element 12 on vertical support structure. Instead of a hook, another protrusion may be used or a suspension opening for receiving a protrusion located on a vertical support structure. Alternatively, the panel element 12 is not provided with any such mating member and is carried by a shelf bracket.

Connector 22 is located at a corner of panel 20, on the back surface or on a bracket attached to panel 20, rotatable around a rotation axis 224 that runs perpendicular to the plane of the drawing. The figure shows an embodiment of connector 22 with two connector pins 220*a,b* and a connector body 222. In an embodiment, each pin may comprise an electrically conducting tip. An electrically insulating bus may be provided for the pin, the tip of the connector pin being located in the bus at the tip of the bus and extending from the bus.

A spring may be provided that acts between the bus and the connector pin tip to push the electrically conducting tip outward. The bus may be seen as part of the connector pin. The busses of the first and second connector may cylindrical e.g. with a circular cross-section. Alternatively, the outside of the busses of the first and second connector pin may be interconnected, so as to form an elongated island running from one tip to another. Between the tips the island may be narrowed, so that a figure eight-type cross section arises.

In another embodiment, the connector pins may be entirely be made of electrical conductor material. In this case the outside surface of vertical support structures 10 is preferably of electrically insulating material. Herein, the plural "pins", such as in the term first and second connection pins, is used when there is a plurality of conductor tips, i.e. for completely conductive separate pins, for pins tips on with separate busses, as well as a for an elongated island of electrically insulating material with a plurality of tips located in the island.

In FIG. 2 connector 22 is shown in an extended position wherein connector pins 220*a,b* extend beyond the plane of the side edge of panel 20. The relative location of pins 220*a,b* with respect to each other corresponds to the relative positions of contact openings for the pins in the vertical support structures (not shown). The relative location of pins 220*a,b* with respect to hook 24 corresponds to the relative positions of contact openings for the pins to a slot in the vertical support structure for receiving hook 24, in the position where the panel element hangs on the hook in the slot.

The extended position corresponds to a location of the tips of the connector pins wherein they are in contact with the first and second electrical power supply contacts within the vertical support structure and the pulled-in position correspond to a location of the tips outside the outside surface on the side of the vertical support structure of substantially at the outside surface. In other words, in terms of a virtual plane perpendicular to the planar surface and through the hook or other protrusion and/or second opening nearest the connector, when the connector pins are set in motion from the pulled-in position towards the extended position, the tips of the first and second connector pins are moved in the direction of that virtual plane. In the extended position, the location of the tips may be between the virtual plane and their location in the pulled-in position, or even on the opposite side of the virtual plane.

FIG. 3a,b show an embodiment connector 22 in more detail in the extended position and a pulled-in position respectively. In the illustrate embodiment connector 22 comprises a housing 30 a moving part 32 and a spring 34. Housing 30 is provided with a resilient lip 300 extending inward from the side edge of the panel (not shown), a cylindrical protrusion 304 extending perpendicularly to the base plane remote from lip 300 and a side wall 306, extending perpendicularly to the base plane on an inward side of housing 30. The top edge 200 and side edge 202 of the panel (not shown) are indicated by dashed lines. Cylindrical protrusion 304 serves as a hinge axis for rotating movement of moving part 32, however instead any other type of hinge may be used. Spring 34 may be realized by means of a metal wire comprising coiled windings around cylindrical protrusion 304 and pawls extending from the coiled winding, which exert a force to push moving part 32 towards the side wall 306. But any other type of spring that acts similarly may be used. Resilient lip 300 serves to latch moving part 32. For this purpose a detent notch 302 is provided on resilient lip 300.

Moving part 32 has an outside surface and an inside surface, facing in the directions outward and inward from the side edge of the panel respectively. Moving part 32 contains a cylindrical hole that fits around cylindrical protrusion 304 so as to allow moving part 32 to rotate around cylindrical protrusion 304.

Electrically conductive connector pins 220a,b are provided on a side wall moving part 32 extending in parallel with the base plane, at a position between cylindrical protrusion 304 and lip 300 from the outside surface of moving part 32. Connector pins 220a,b are electrically connected to electrical wiring (not shown) within the panel.

Except for connector pins 220a,b moving part 32 is of electrically insulating material. Spring 34 is coupled between housing 30 and moving part 32, so as to exert a spring force to rotate the inside surface of moving part 32 towards side wall 306 of housing 30.

FIG. 3a shows the connector in the extended position. Lip 300 is located above the top surface of moving part 32 and configured to assume a position wherein notch 302 extends below the plane of the top surface of moving part 32 along the inside surface of moving part 32 (or at least an inside wall part facing away from the side edge 202 of the panel), latching connector 22 in the extended position. In the extended position the outside surface of moving part 32 substantially coincides with the plane of the side edge 202 of the panel. In the extended position connector pins 220a,b extend from that plane.

FIG. 3b shows the connector in the pulled-in position, wherein the inside wall of moving part 32 is pressed against a lower part of side wall 306 of housing 30 by spring 34. An upper part of side wall 306 of housing 30 diverges from the inside wall of moving part 32, leaving a space that is open upward, so that it can be accessed from above the panel element. In the pulled-in position, the inside wall of moving part 32 is further inward from the plane of the side edge 202 of the panel than detent notch 302, which is above the top surface of the connector in the pulled-in position, without latching moving part 32. In the pulled-in position the tips of connector pins 220a,b are located substantially at the plane of the side edge 202 of the panel, or inward of that plane.

In operation the panel element 12 is hung on vertical support structures 10 e.g. with the hooks in corresponding openings in vertical support structures 10. Connector 22 is initially in the pulled-in position while panel element 12 is hung on vertical support structures 10. This is necessary because otherwise contact between connector pins 220a,b and the front of a vertical support structure 10 would obstruct the movement required to enter hook 24 into the corresponding opening on the vertical support structure 10.

After the panel element 12 has been hung up, connector 22 is moved to its extended position, whereby connector pins 220a,b are moved into contact openings in the side surface of the vertical support structure 10 and contact the electrical contacts within the vertical support structure. Thus, no unstable electrical contact occurs when the panel element is hung up, thus protecting electrical components in the panel element against damage.

To move connector 22 to its extended state, moving part 32 is rotated from side wall 306 until detent notch 302 latches moving part 32 into position. The rotation may be effected by inserting a finger or a tool in the space left between the upper part of side wall 306 of housing 30 diverges and the inside wall of moving part 32 and pushing moving part 32 outward from that space.

When the panel element is removed, connector 22 is first returned to its pulled-in position, by pulling up lip 300, which enables spring 34 to force moving part against side wall 306. Subsequently, panel element 12 may be unhooked from vertical support structures 10.

Although embodiments have been shown wherein an accessible space is provide to move the connector from its pulled-in state to its extended state, it should be appreciated that other solutions may be used. For example a lever may be provided that extends from the housing, and that is arranged to transfer a force on the lever to the movable part of the connector.

Figure 5:
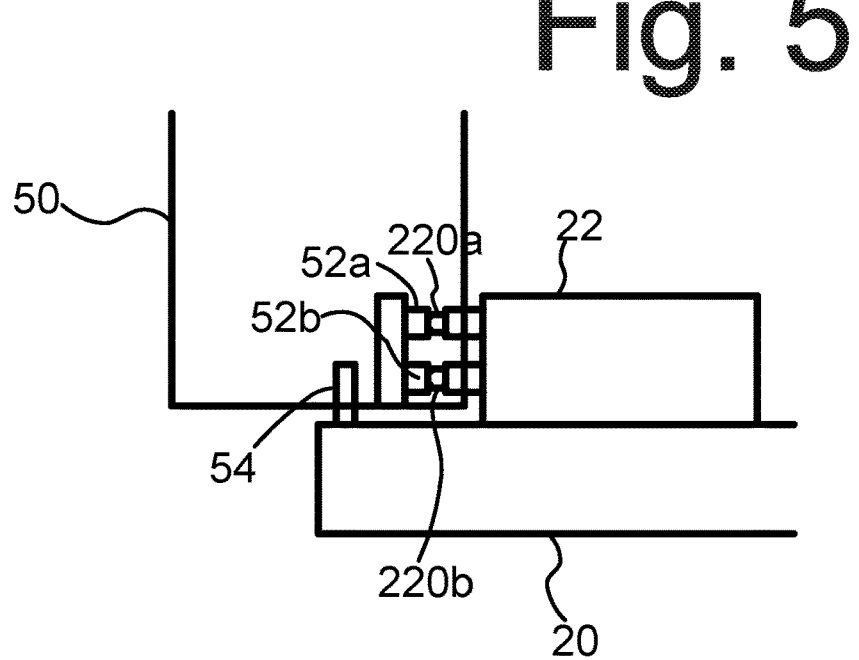
FIG. 5 shows a cross-section in top view

FIG. 5 shows a top view of a cross-section through a panel element and a vertical support structure. The vertical support structure comprises an outside wall 50 and electrical contacts 52a,b inside outside wall 50. The panel element comprises a hook 54 extending from the back plane of the panel 20 of the panel element. The connector pins 220a,b of the connector 22 are shown in the extended position, extending through the outside wall 50 to electrical contacts 52a,b.

In the illustrated embodiment, connector pins 220a,b each comprises an electrically isolating bus and an electrically conducting tip, electrically isolating bus extending through the outside wall 50 to electrical contacts 52a,b and the electrically conducting tip being located within the outside wall 50 of the vertical support structure. Electrical contacts 52a,b may be conductor lines extending vertically within the vertical support element, of which a cross-section is shown.

Preferably the connector has a housing with an outside surface that lies backward of the plane between front surfaces of the vertical support structures, e.g. on the back surface of the panel or a bracket attached to the panel.

Although an embodiment has been shown wherein the connector has only two connector pins 220a,b, it should be appreciated that more pins may be provided. For example, one or more additional pins may be provided for data signals. In this case, one or more additional contacts may be provided within the vertical support structure for the data signals, with one or more corresponding openings for in the outside surface of the vertical support structure. Furthermore, although two connector pins 220a,b may suffice in connector 22 to provide power supply poles, in another embodiment a plurality of pins is used for at least one of the poles and preferably for both.

FIG. 4 illustrates the embodiment wherein a plurality of pins is used for each poles. The plane of the figure is parallel to the side edge of panel 20, i.e. perpendicular to the length direction of panel towards the next vertical support structure. FIG. 4 shows the outside surface 40 of the moving part of the connector with a first and second pair of connector pins 42a,b 44,a,b.

In the figure, the tips of connector pins are shown. As noted, the connector pins including their tips may be entirely of electrically conductive material, or the connector pins may comprise an electrically insulating bus and an electrically conductive tip in the bus. In an embodiment, the outside of the busses of pairs of pins may be connected, i.e. in an elongated island.

Internally in the connector, or at least in the panel element, connector pins 42a,b of the first pair are connected to a same first power supply line. Similarly, connector pins 44a,b of the second pair are connected to a same second power supply line, distinct from the first power supply line. Each connector pin may have a diameter of no more than 5 mm for example.

Within the vertical support structure a first pair of contact openings, or a single first contact slot is provided to allow entering connector pins 42a,b of the first pair, and a first electrical contact is provided within the vertical support structure to contact both connector pins 42a,b of the first pair.

Similarly, a second pair of contact openings, or a single second contact slot is provided within the vertical support structure to allow entering connector pins 44a,b of the second pair, and a second electrical contact is provided within the vertical support structure to contact both connector pins 44a,b of the second pair. In this way the reliability of the power supply is increased. Each contact opening may have a diameter of no more than 5 mm for example, or the width of the contact slots may be no more than 5 mm for example to prevent accidental finger contact.

Although specific embodiments have been shown, it should be appreciated that variations are possible. For example, the connector may be located at the bottom corner of the panel instead of at a top corner. Instead of being provided in a corner, the connector may be provided at the top or bottom edge of the panel at a location of a further intermediate vertical support structure of the system.

The further vertical support structure may comprise internal contacts and contact openings at its side, like the other vertical support structures (the panel need not be hooked to this further vertical support structure, i.e. the structure, although vertical, may provide only back support without need to have a vertical support function).

Instead of a panel that extends between two adjacent vertical support structures, a panel may be used that extends over more than two successively adjacent vertical support structures. In this case, an outermost vertical support structure may be used in combination with a connector at a corner of the panel to supply power. Alternatively, a connector may be used to provide power from an intermediate vertical support structure.

Although embodiments have been shown wherein the moving part of the connector rotates sideways, it should be realized that other kinds of sideways motion may be used, such as linear motion. This linear motion preferably has a component in the linear motion vector that is parallel to the upper surface of the panel element. The moving and/or fixed part of the connector may be provided with guide rails to guide such motion. In each case a spring forces the moving part inward and a detent latches into an extended position wherein the connector pins contact contacts in the support structure.

Although embodiments have been shown wherein the detent is realized by means of a notch on a lip that is attached to the fixed part, the notch latching over the inside wall of the moving part, it should be realized that other kinds of detents may be used. For example, a groove may be provided in the lip instead of the notch, the notch being provided on the moving part of the connector. As another example the resilient lip may be located on the moving part. In other embodiments a lip-based notch may be used that latches into a slot on the top surface of the moving part of the connector, or a plurality of notches may be used etc.

Although embodiments have been shown wherein hooks on the panel or vertical support structures are used to hang up the panel, it should be realized that other protrusions or other mating members may be used for this purpose. Although embodiments have been shown wherein protrusions on the panel or the openings in the panel, which are used to hang up the panel, extend perpendicularly to the back plane of the panel, in other embodiments protrusions or openings at another angle transverse to the back plane of the panel may be used, for example at an angle between forty five and ninety degrees to the back plane (as used herein, "transverse" is not limited to perpendicular).

Similarly, the connector may be configured to move the connector pins at a non-zero angle with respect to the back plane, transverse to the normal of the back plane. Thus, the connector pins, although transverse to the protrusions or openings for hanging, need not be perpendicular to them. In another embodiment, protrusions or openings for hanging up the panel may extend in parallel with the back plane, to enable hanging up the panel on the side of the vertical support structures rather than on the front. In embodiment the vertical support structures or the panel may have slots to allow such parallel extending hang-up protrusions to be entered sideways to the direction in which they extend.

What is claimed is:

1. A panel element configured to be used in a modular wall system including a plurality of vertical support structures, at least one of the vertical support structures comprises first and second electrical power supply contacts within said at least one of the vertical support structures and an opening in a surface of the at least one of the vertical support structures, the opening configured to enable electrical conductors to contact the first and second electrical power supply contacts therethrough, the panel element comprising:
    a panel having a planar surface and side edges transverse to the planar surface;
    an electrical connector comprising a first connector pin and a second connector pin configured to form electrical connections, the first and second connector pins having a cross-section configured to fit within the opening of the at least one vertical support structure, the first and second connector pins being movably coupled to the panel so as to enable movement of the first and second connector pins in at least one direction parallel to the planar surface, between an extended position and a pulled-in position of the electrical connector, the electrical connector being spring loaded to exert a force towards the pulled-in position;
    a housing one of within or attached to the panel;

a movable part configured to be movable relative to the housing, wherein the first and second connector pins being located on the movable part; and a detent configured to latch the electrical connector with the first and second connector pins in the extended position.

2. A panel element according to claim 1, wherein the planar surface extends between the side edges over a length configured to be at least substantially equal to a distance between successive vertical support structures of the plurality of vertical support structures.

3. A panel element according to claim 1, the panel element further comprising first mating members configured to mate with corresponding second mating members of the at least one of the vertical support structures configured to enable the panel element to be supported by the vertical support structure when the first mating members are mated with the corresponding second mating members.

4. A panel element according to claim 3, wherein the first mating members comprise at least one of first openings or first protrusions.

5. A panel element according to claim 1, wherein the electrical connector has an access opening to a space between a wall of the housing and an inside wall of the moving part, the first and second connector pin extending from an outside wall of the moving part.

6. A panel element according to claim 5, wherein the electrical connector is located at one of a top or bottom edge of the panel, the access opening being accessible from a direction transverse to the top or bottom edge.

7. A panel element according to claim 6, wherein the electrical connector is located at a corner of the panel.

8. A panel element according to claim 1, wherein the connector is located on an external surface of a back plane of the panel.

9. A panel element according to claim 1, comprising a hinge coupling between the housing and the movable part, the hinge coupling configured to enable rotation around a rotation axis normal to the back plane of the panel, whereby the first and second connector pins are moved in a plane parallel to the back plane of the panel.

10. A panel element according to claim 1, wherein the housing comprises a resilient lip attached to the housing and a detent notch on the resilient lip.

11. A panel element according to claim 1, wherein the panel has a closed surface at its back plane, the housing lying on the back plane of the panel.

12. A panel element according to claim 1, wherein the first and second connector pins comprise a first and second electrically conductive tip located in at least one electrically insulating bus, the at least one electrically insulating bus having a cross-section configured to fit within the opening of the at least one of the vertical support structures.

13. A panel element according to claim 1, wherein the electrical connector comprises a third connector pin electrically connected to a power supply line in the panel connected to the first connector pin, the third connector pin being directed in parallel with the first connector pin.

14. A modular wall system comprising:
a first vertical support structure and second vertical support structure; and
a panel element, comprising:
a panel having a planar surface and side edges transverse to the planar surface;
an electrical connector comprising a first connector pin and a second connector pin configured to form electrical connections, the first and second connector pins having a cross-section configured to fit within an opening of one of the first or second vertical support structure, the first and second connector pins being movably coupled to the panel so as to enable movement of the first and second connector pins in at least one direction parallel to the planar surface, between an extended position and a pulled-in position of the electrical connector, the electrical connector being spring loaded to exert a force towards the pulled-in position; and
a detent configured to latch the electrical connector with the first and second connector pins in the extended position,
wherein the panel element configured to be hung-up on the first and second vertical support structure, the first vertical support structure comprising first and second electrical power supply contacts and a contact opening in an outside surface of one of the first or second vertical support structure, the first and second connector pins being in contact with the first and second power supply contacts through the contact opening respectively in said extended position.

15. A modular wall system according to claim 14, wherein one of the first or second vertical support structure comprises a first and second internal vertical conductor lane, the first and second electrical power supply contacts being part of a surface of the first and second internal vertical conductor lane respectively.

16. A modular wall system according to claim 15, wherein the outside surface of one of the first or second vertical support structure comprises sets of first and second contact openings at a plurality of heights along the first vertical support structure, each set providing for access by the first and second connector pins to the first and second internal vertical conductor lanes at a respective different height, the first and second vertical support structure comprising further one of openings or protrusions configured to hang the panel element on the first and second vertical support structures at the respective different heights.

17. A modular wall system according to claim 14, wherein a back surface of the panel element hangs facing front facing parts of the outside surface of the first and second vertical support structure and the first and second contact openings are located in a side facing part of the outside surface of the first vertical support structure.

* * * * *